Dec. 6, 1955  D. A. DAVIS, JR  2,726,136
SOLID PARTICLE TRANSFER PROCESS AND APPARATUS
Filed July 13, 1951  5 Sheets-Sheet 2
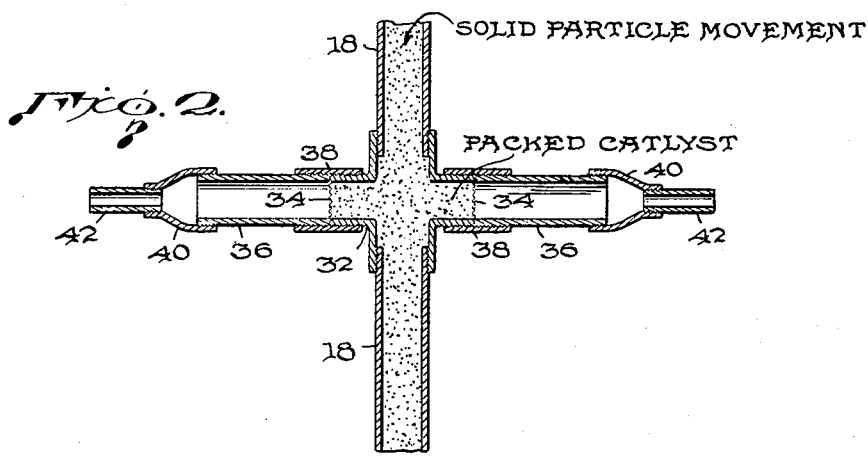
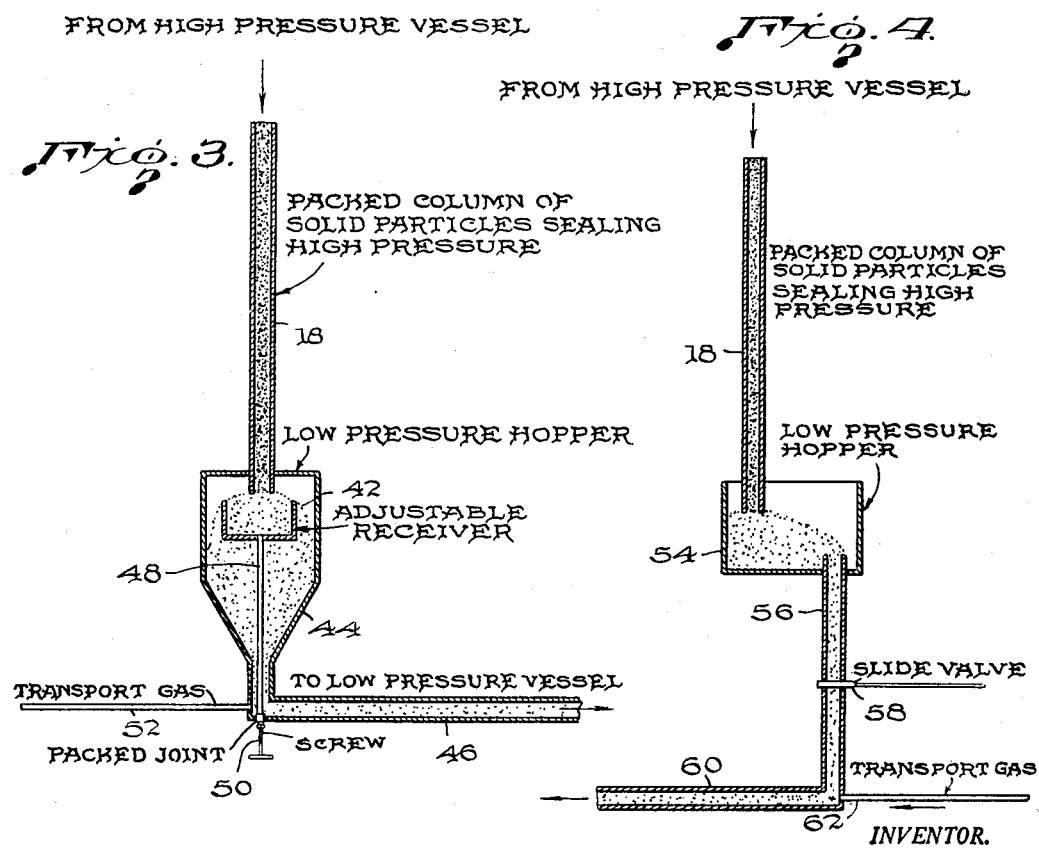
INVENTOR.
DAMON A. DAVIS, JR.
BY
HIS ATTORNEY

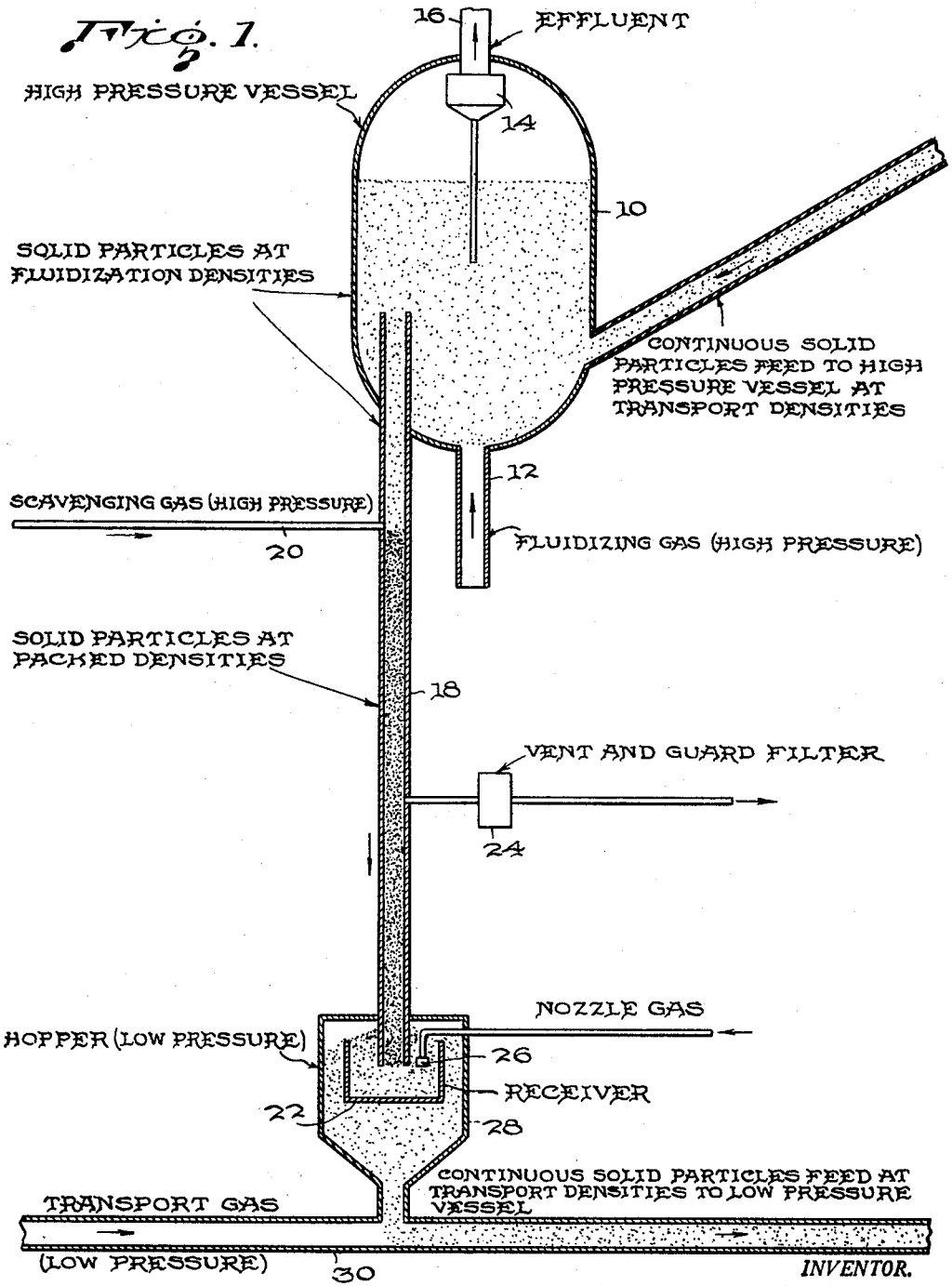

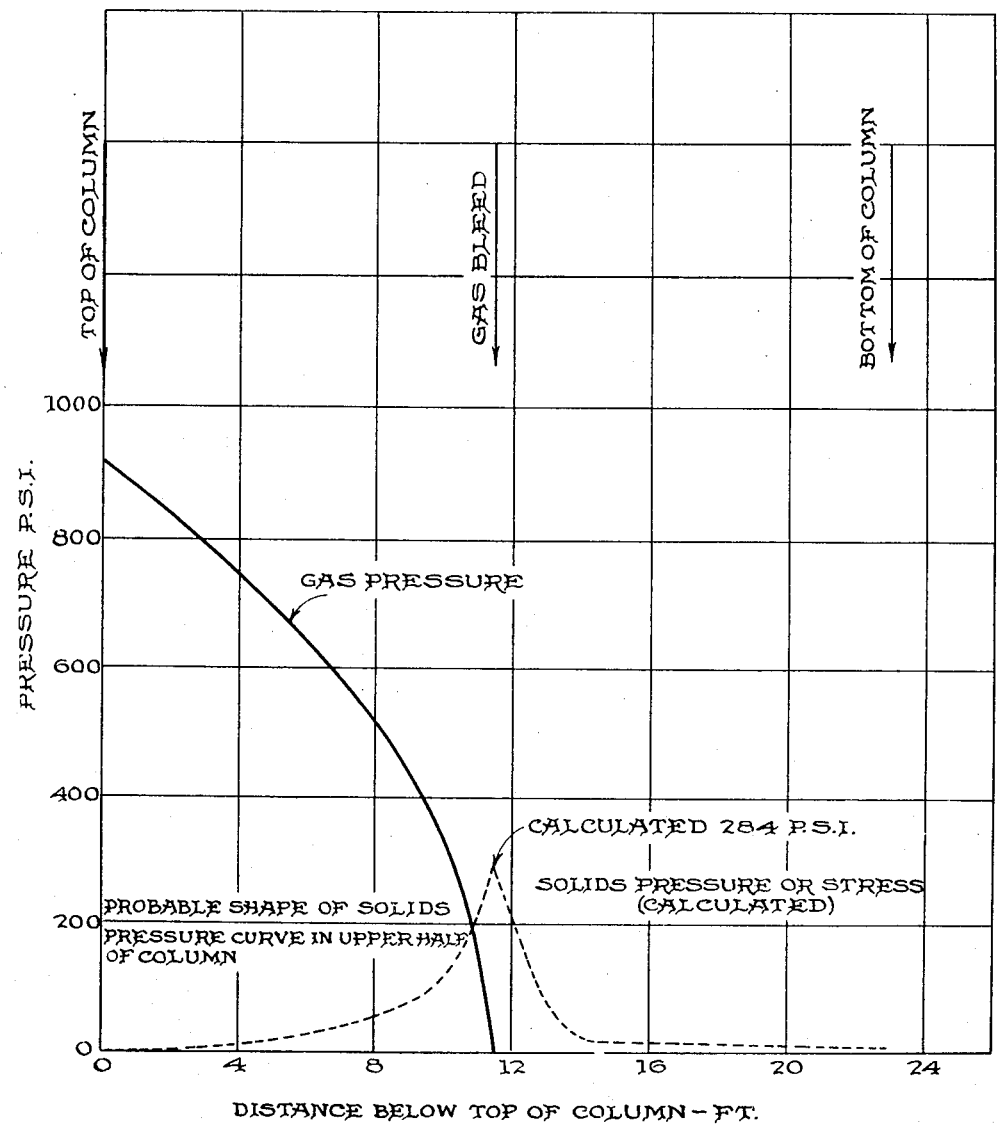

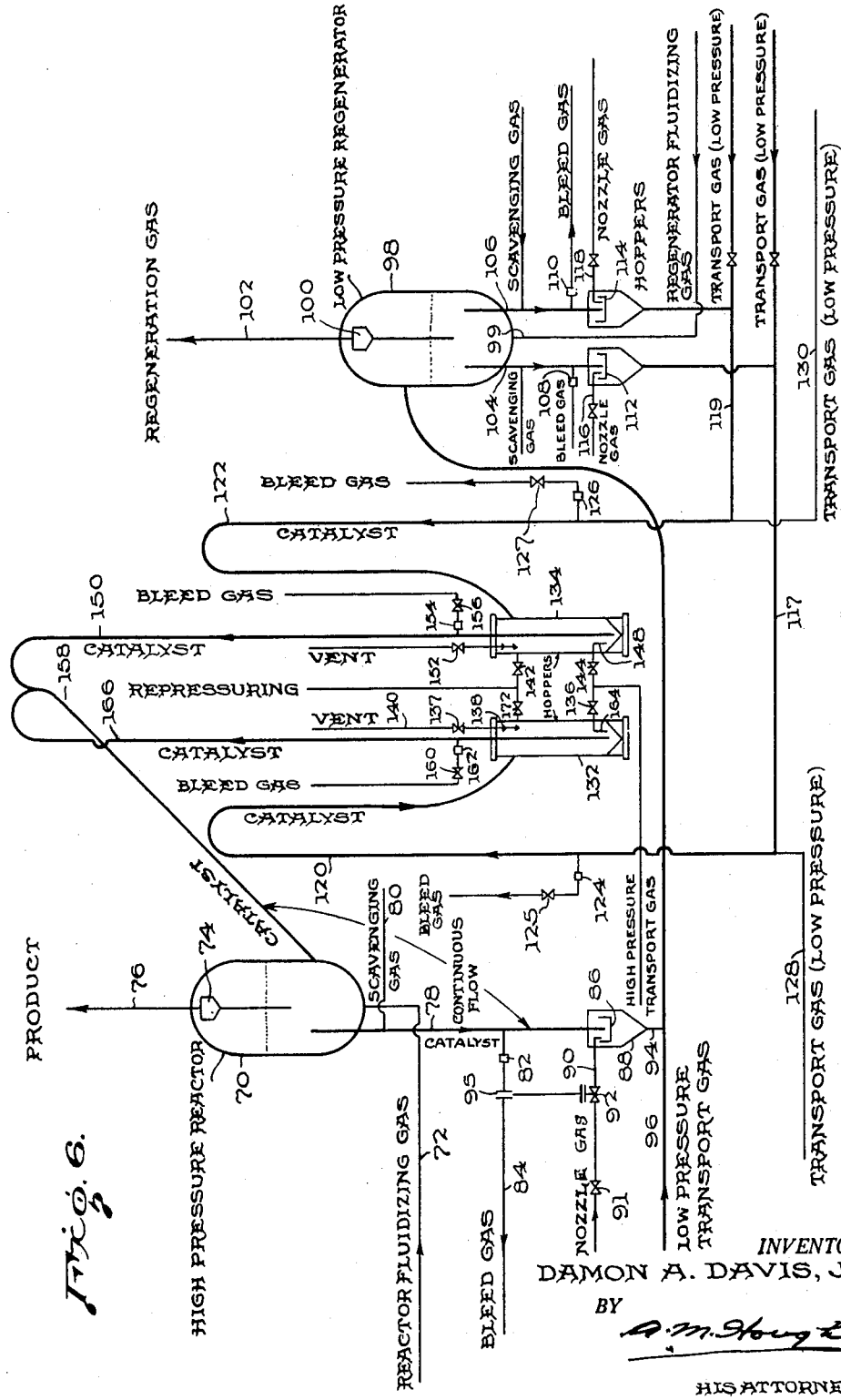

United States Patent Office 2,726,136
Patented Dec. 6, 1955

2,726,136

SOLID PARTICLE TRANSFER PROCESS AND APPARATUS

Damon A. Davis, Jr., Port Arthur, Tex., assignor to Gulf Oil Corporation, Pittsburgh, Pa., a corporation of Pennsylvania Application July 13, 1951, Serial No. 236,538

18 Claims. (Cl. 23—1)

This invention relates to apparatus for introducing solid particles into a high pressure system and/or for preventing substantial passage of gas between a high and low pressure system.

The control of flow of solid particles such as during the introduction into and removal of solid particles from a high pressure system is a problem which has been frequently encountered but has not been completely solved. Solid particles can be suspended in a liquid to form a slurry and then passed through valves or the like. However, there is a limit to the amount of solids that can be suspended and still have a liquid mixture. Also wear of apparatus takes place and it is frequently undesirable to wet the solid particles with a liquid. Also solid particles can be suspended in a gas to resemble a fluid and passed through ordinary gate or compression valves. However, the moving parts of such valves are rapidly destroyed by the abrasive action of the solid particles. It has been proposed in U. S. Reissue Patent No. 23,237, May 30, 1950, to utilize a densely packed column of solid particles as a means for passing solid particles between systems of different pressures and simultaneously preventing flow of gas between the two systems. The only specific application mentioned was fluidized catalytic cracking. In this particular operation the pressure differential within the system in which the catalyst particles are circulated is relatively small. Tests indicate that this procedure is satisfactory for small pressure differentials only. For instance, a densely packed column of solid particles of one typical fluid cracking catalyst 3 feet high is blown out of the vertical conduit in which it is contained when the pressure differential is 10 pounds per square inch. Similarly a densely packed column 26 feet high is blown out of the supporting vertical conduit when the pressure differential is 29 p. s. i. g. It is evident that exceedingly long packed columns would be required for high pressure differentials. Also, even with low pressure differentials there is some leakage of gas from the high pressure end of the column to the low pressure end of the column. In other words, the particles are not a complete stopper or plug. This leakage of gases cannot be tolerated in certain operations.

This invention has for its object to provide apparatus whereby the foregoing difficulties can be overcome.

Another object is to provide apparatus which will permit controlled passage of solid particles therethrough but which will not permit substantial gas flow therethrough.

Another object is to provide apparatus for introduction of solid particles into a high pressure system from a low pressure system without substantial loss of gas from the high pressure system into the low pressure system.

A still further object is to provide a complete system for transfer of solid particles from a low pressure system into a high pressure system without substantial leakage of gas between the system and without utilizing a mechanical valve for controlling the flow of solid particles.

Other objects will appear hereinafter.

These and other objects are accomplished by my invention which includes a substantially vertical conduit, means for supplying solid particles under elevated pressure to one end of the conduit, a gas vent positioned between the ends of the vertical conduit and means associated with the vent for preventing the substantial flow of solid particles through the vent. One specific modification of my invention includes a substantially vertical conduit as described above, means for supplying solid particles under elevated pressure to the lower end of the vertical conduit, a gas vent and means for preventing substantial flow of solid particles through the vent as described. Another modification of my invention includes a substantially vertical column as described, means for supplying solid particles under relatively low pressure to the upper end of the vertical conduit, means for removing solid particles at a controlled rate from the lower end of the vertical conduit, a gas vent and means for preventing flow of solid particles through the vent. Other modifications within the scope of my invention will become apparent from the following description and claims.

In the following examples and description I have set forth several of the preferred embodiments of my invention but it is to be understood that they are given by way of illustration and not in limitation thereof.

In the accompanying drawings I have illustrated apparatus embodying the principles of my invention. Referring to these drawings:

Figure 1 is a diagrammatic elevation in section of apparatus for removing solid particles from a high pressure system to a lower pressure system in accordance with the basic principles of my invention;

Figure 2 is an enlarged diagrammatic vertical section showing details of the filtering means utilized in Figure 1;

Figures 3 and 4 are enlarged diagrammatic elevations in section of alternative apparatus for controlled removal of solid particles from the base of the vertical column of solids;

Figure 5 is a graph illustrating the manner in which the gas pressure and the solids pressure varies throughout the length of the vertical compact column of solids;

Figure 7:
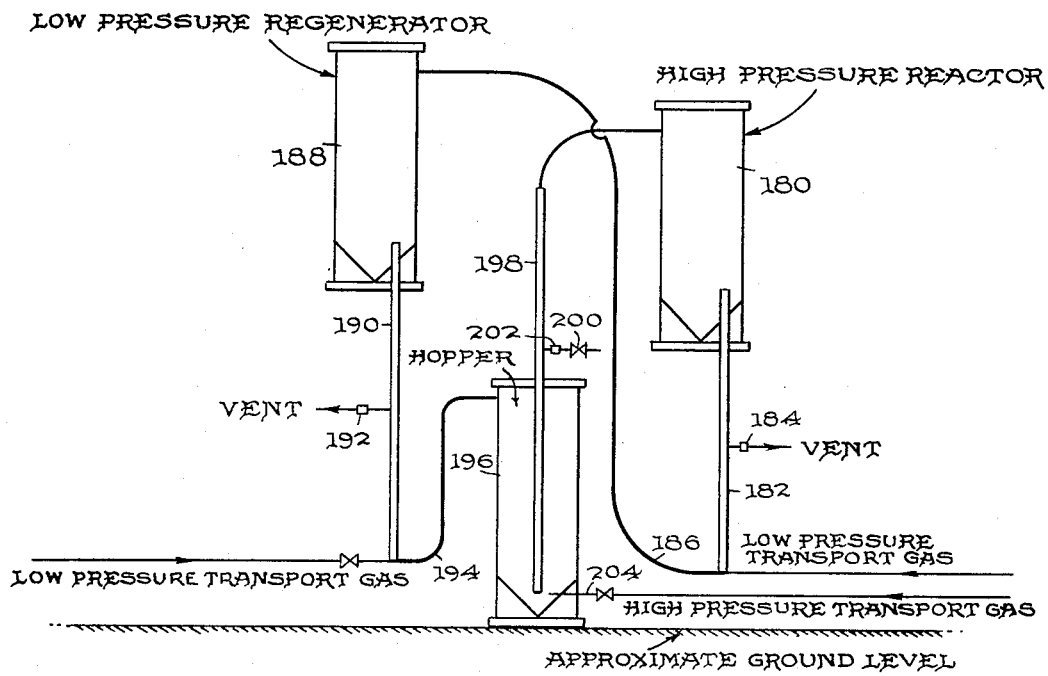

Figure 6 is a diagrammatic elevation, partly in section, of suitable apparatus for carrying out a complete and continuous high pressure operation in which solids are continuously introduced and removed from the high pressure chamber in which the operation is carried out; and Figure 7 is a diagrammatic elevation of continuous apparatus similar to that illustrated in Figure 6 except that the necessity for long loops of conduit at the top of certain of the vertical columns of solid particles is avoided.

Referring to Figure 1 numeral 10 indicates a high pressure chamber in which an operation utilizing solid particles in fluidized form is carried out. For convenience, a hydrocracking or destructive hydrogenation operation will be described. This operation would be conducted in this reactor by introducing hydrogen and vapors of a hydrocarbon to be hydrocracked through conduit 12 and under high pressure. The hydrogen and vapors maintain the solid particles in reactor 10, which in this instance would be a hydrogenating catalyst, in a fluidized condition. The hydrogen and the hydrocarbon products are separated from the solid particles in cyclone separator 14 and flow out of the system through conduit 16. Solid particles in a fluidized condition, i. e., suspended in the hydrogen, settle into the top of vertical conduit 18 by gravitational force. The upper part of column 18 serves as a scrubbing section, the hydrocarbons and the hydrogen associated with the solid particles being removed by a scavenging gas such as high pressure steam introduced through conduit 20. The passage of gas through conduit 20 is at a rate such that the solid particles slowly settle through the upflowing current of gas and finally become lodged in the portion of the conduit 18 below conduit 20. The solids in this column settle into a vertical compact column which is supported by a cup-shaped member 22 positioned at the base of the column and within hopper 28 which is at a substantially lower pressure; i. e., in the case under consideration about atmospheric. A certain amount of scavenging gas will pass through the interstices between the particles in the upper part of column 18. Due to the resistance to flow of gas through the compact column the pressure of the gas will progressively decrease during such passage. These gases are vented at relatively low pressure through vent 24 which is provided with means for preventing flow of solid particles from the column 18 through the vent. The pressure of the gas and/or solid particles at the base of the column is therefore relatively low and the accumulation of a small pile of catalyst in cup 22 prevents the uncontrolled flow of catalyst particles from the column.

Catalyst particles contained in cup 22 are continuously or intermittently blown therefrom by gas passing through nozzle 26. Upon such removal the solid particles in column 18 flow downwardly to replace those which have been removed. If these are permitted to accumulate a small pile of catalyst again forms around the base and will prevent further flow until removed by the action of nozzle 26. This removed catalyst is conveyed by the current of gas into hopper 28 and thence into the conduit 30 where it is picked up and transported to any desired location by low pressure transport gas passed through conduit 30.

Referring to Figure 2, numeral 18 designates the vertical conduit of Figure 1 containing the compact solid particle column. Numeral 32 designates a plurality of conduits connected to conduit 18, the ends of which are covered with wire cloth filters 34. These wire cloth filters are held in place by pipe nipples 36 and pipe couplings 38. The ends of nipples 36 connect to reducers 40 and conduits 42 which may be connected to a suitable gas disposal or recovery system. The wire cloth filters 34 should have a sufficiently fine mesh to prevent substantial flow of the solid particles therethrough. This filter effectively vents the gas passing downwardly through the upper portion of the compact column in 18 and at the same time prevents substantial passage of solid particles through the vent. The screen or means for preventing passage of solid particles is important since the rate of flow of gas at this point will in most cases be sufficient to transport the solid particles and cause a blowout through the compact column and the vent unless such filtering means or the like is provided.

Any device which will prevent substantial flow of solid particles through the vent can be used. For instance, a graduated bed of pieces of solid which increase in size as the vent is approached could be used to prevent the flow of solid particles through the vent. It is not necessary, as far as the operation of the vertical compact column is concerned, to prevent all of the solid particles from passing into the vent. A small amount of particles passing through the vent will not upset the sealing action of the compact column. However, such passage may be undesirable for other reasons, such as abrasion of apparatus beyond the vent, or loss of solid particles and for such reasons I prefer to keep passage through the vent as low as possible and usually at about a zero value.

If the vent between the upper and lower parts of the conduit 18 were not used the high pressure gas contained in the chamber 10 would pass downwardly through the compact column and if there was a material pressure differential between the top and bottom of the column this passage of gas would be at a sufficient rate to transport catalyst at the bottom of the column. This would result in a blowout of the entire column and nullify the purpose of the column. Of course this could be avoided by utilizing an exceedingly long column. However, as indicated above, impractically high columns would be required for material pressure differentials. When utilizing the principles of my invention a compact column 6 feet high is adequate to operate with a pressure differential of 100 pounds. A column 27 feet high is entirely adequate for a pressure differential of 900 pounds. Without the vent a column approximately 200 feet high would be required for a pressure differential of 100 p. s. i. g.

Figures 3 and 4 illustrate other methods for controlled removal of solid particles from the base of the column. Referring to Figure 3, numeral 42 designates a cup-like container or support at the base of the column 18, which container is positioned in closed receptacle 44. Receptacle 44 is connected to transport conduit 46 at its lower extremity. Cup 42 is supported by a shaft 48 which can be moved upwardly or downwardly by means of screw 50. Movement of the cup up or down adjusts the rate of flow of catalyst or solid particles from the base of the column 18. The pile of solid particles builds up in cup 42 and overflows the upper edge thereof. If the cup is raised the pile of catalyst will rise above the lower edge of vertical conduit 18 and plug up the lower end of the column and thus prevent further flow of catalyst or solid particles. If the cup 42 is lowered the solid particles will at some point begin to overflow the edge of the cup and the lower the cup is positioned the greater the rate of flow. The removed solid particles flow into conduit 46 where they are picked up by transport gas introduced through conduit 52.

Referring to Figure 4, numeral 54 indicates a cup-like member positioned below vertical conduit 18 in which a pile of solids is permitted to accumulate under the end of the column 18. Numeral 56 designates a conduit connected to the lower part of cup 54 and provided with a slide valve 58. Numeral 60 designates a conduit for removal of solid particles by means of transport gas introduced through conduit 62. The rate of flow of the catalyst from cup 54 is determined by the setting of slide valve 58. If the slide valve is closed the solid particle pile will build up in cup 54 and plug the end of the column and prevent further flow. Opening the slide valve permits catalyst to flow from around the base of the column which initiates flow of solids from the column.

Mechanical removal means may be used instead of the devices illustrated in Figures 3 and 4. For instance, an endless conveyor belt run at controlled speed under the end of the column may be used to obtain controlled removal of the solid particles. Similarly a screw conveyor for the solid particle removal could be used.

Figure 5 illustrates the manner in which the pressure of the gas and the pressure of the solid particles (the vertical pressure) varies down the length of a column when the pressure differential is approximately 900 pounds and the height of the column is roughly 23 feet, with the vent at the mid point. It will be noted that the gas pressure (solid line) falls to practically zero at the vent and that there is substantially no gas pressure between the vent and the lower end of the column. On the other hand, the pressure of the solids as determnied at any point in the colunm (shown by the dotted line) reaches a maximum in the neighborhood of and both below and above the vent. This pressure is dissipated against the walls of the column. The pressure at the base of the column is negligible due to the absence of solids pressure as well as gas pressure at the base of the column. Therefore very little support for the column of solid particles, other than that due to the weight of the solids, is required and the removal of the catalyst under these conditions is a relatively simple matter.

It is preferable to employ a vent at approximately the mid point of the column. However, the position of the vent can be varied considerably as long as sufficient column length of compact solid particles is provided below and above the vent to dissipate the gas and solid pressure so that it will not upset the lower part of the column. A plurality of vents may be employed and these may be spaced at intervals up and down the column if desired. The filter for preventing flow of solid particles through the vent must permit adequate flow of gas. The gas flowing through the forepart of the column preferably should be permitted to escape freely through the vent rather than to be largely compelled to flow through the afterpart of the column. Any solid particle removing means may be used.

It is desirable, although not necessary, to have the solid particles in fluidized condition when they are fed into the column and prior to the time when they form the compact column. This results in even distribution of the solid particles in the column and avoids possibility of formation of cakes or gobs of particles which might bridge across the column and result in uneven feeding through the column. The size of the particles can vary to a considerable extent. Also, the particles need not be uniform in size. In general a mesh size of between about 100 and 400 mesh can be utilized. The larger meshes will require longer vertical columns.

The diameter of the column is of course determined by the volume of solid particles that must pass through it. The compact column will under most conditions move at least 50,000 lb./hr./sq./ft. of fluid type catalyst. The catalyst flow rate does not appreciably affect the gas flow through the column. In general the length of the column will depend upon how much gas can be permitted to flow through the vent and the location of the vent. If a large amount of gas passing through the vent can be tolerated a large vent and a shorter column can be used. On the other hand, a longer column would be necessary if minimum vent gas is desired. The location of the vent about at the mid point gives optimum results. However, it can be located off center to any desired extent but in such case the column must be of sufficient length between the high pressure zone and the vent to appreciably lower the pressure by the resistance offered by the solid particles of the flow of gas between the high pressure end and the vent and between the vent and the low pressure end. The vent must be far enough from the low pressure end of the column to prevent gas flowing from the end at a sufficiently high velocity to blow out the catalyst acting as a plug or seal.

Specifically, the length of the pressure seal leg is determined by the allowable amount of total gas leakage, that is, the longer the leg the less the total gas leakage. This total gas leakage is the sum of:

(1) Leakage through the vents (the great majority of the gas leakage occurs at this point), and
(2) The leakage from the bottom of the column.

Once the total gas leakage is decided upon, the minimum operable length of the column may be determined by the following formula:

$$L = 0.0235 \frac{P_i^2 - P_o^2}{G}$$

where $L = \frac{1}{2}$ column length in feet
$P_i$ = inlet pressure—p. s. i. a.
$P_o$ = outlet pressure—p. s. i. a.
$G$ = total gas leakage based on cross-sectional area of the column—lb./hr./sq. ft.

At this point in the calculations the length of the column and the total gas leakage have been determined. However nothing is known concerning the distribution of the gas leakage, i. e.—what part of the gas goes through the vents and what part leaves the bottom of the column. The gas leakage through the vent or vents is a function of:

(1) The cross-sectional area of the vents and
(2) The depth of the catalyst on the vent retaining screens. These two variables are related by the following formula:

$$\frac{A_b}{L_b} = \frac{A_a}{L}(0.647\ G - 1)$$

where $A_a$ = area of the column in sq. ft.
$A_b$ = vent area in sq. ft.
$L_b$ = thickness of layer of solids on the vent retaining screens in feet.

The other symbols are defined in the first formula above.

The above equations will serve as general guides, but it is to be noted that they are determined for a case involving an inert gas, a solid particle of 250 mesh and atmospheric temperature. Suitable adjustment for other materials and conditions must be made.

I wish to emphasize that a column designed by the above formulas would be in the direction of the minimum length which should be used and that greater lengths would reduce the total amount of gas leakage. Therefore in the final analysis while the above formulas would be used as a guide in determining the length of the column and the vent requirements the final sizing of the column would be determined by economic considerations, for example, it might be found desirable to make the column somewhat longer than the length given by the formula and reduce the gas leakage, etc.

Referring to Figure 6, which illustrates a complete system for introduction and withdrawal of solid particles, a high pressure vessel in which a destructive hydrogenation operation is carried out in the presence of a fluidized hydrogenation catalyst is indicated by numeral 70. A hydrocarbon to be destructively hydrogenated is introduced in vapor form together with hydrogen through conduit 72 connected to the lower part of reactor 70 which is at a high pressure for instance of about 1000 p. s. i. g. The finely divided solid catalyst in reactor 70 is maintained in a fluidized condition by this passage of gas and vapor and results in destructive hydrogenation of the hydrocarbon passing into contact with or through it. The converted hydrocarbon vapors and hydrogen are separated from the solid catalyst particles by cyclone 74 and then pass from the reactor through conduit 76.

The catalyst particles require regeneration due to accumulation of coke-like materials thereon. This is accomplished by withdrawing catalyst and circulating it to a regenerator; at the same time replacement with fresh catalyst must take place. Catalyst particles to be regenerated settle into the vertical conduit 73 which is adapted to form a compact substantially vertical column in accordance with the principles of my invention. Before the solid particles settle into the compact column, any hydrocarbon absorbed thereon is removed by a scavenging gas under high pressure introduced into the top of conduit 78 through conduit 80. Scavenging gas leaking through the column is vented through combination vent and screen 82 and then passes from the compact column through conduit 84. The compact solid column is supported by cup 86 in hopper 88 and the solid catalyst is removed from cup 86 by gas introduced through conduit 90 at a rate controlled by valve 91. Controller 95 and valve 92 constitute a flow control safety device to prevent blowout through the column as a result of too rapid removal of solid particles or other causes. When the flow of gas through valve 95 becomes excessive it automatically closes controller 95 so that removal of particles from cup 86 ceases. This allows the column of solid particles to be re-established. When re-established, gas flow through 95 is lowered causing controller 92 to open and gas to flow through conduit 90.

The catalyst removed from support 86 is suspended in the removing gas and flows into conduit 94 where it is picked up by a low pressure transport gas flowing through conduit 96 and is thus conveyed to low pressure generator 98 which is at a pressure of about 25 p. s. i. g. Here the catalyst is regenerated in known manner by combustion of the contaminating carbonaceous material on the catalyst. The combustion gas is introduced through conduit 99. This gas also serves to maintain the catalyst particles in a fluidized condition. Combustion products are separated from the catalyst particles by cyclone 100 and then flow from the regenerator through conduit 102. Fluidized catalyst in the regenerator accumulates in vertical conduits 104 and 106 provided respectively with vents and screens 108 and 110 supporting cups 112 and 114 and gas jets 116 and 118. These columns operate to remove catalyst from the regenerator and deliver it to catalyst transport line 117 in the case of vertical conduit 104 and 119 in the case of vertical conduit 106. Low pressure transport gas conveys this regenerated catalyst through lines 117 and 119 into vertical conduits 120 and 122 provided respectively with vents and solid removal devices 124 and 126 and low pressure gas transport lines 128 and 130. Vents 124 and 126 are provided with valves 125 and 127 respectively. These valves are closed during transport of solid particles and are open when the particles in columns 122 and 125 are in a static or packed condition.

Transport gas introduced through conduits 128 and 130 at the base of vertical conduits 120 and 122 serve to break up the compact column in these conduits and open them up for transport of catalyst therethrough. Transport gas introduced through conduits 117 and 119 conveys the catalyst particles upwardly through vertical conduits 120 and 122, through the extended loops at the top thereof and thence into regenerated catalyst hoppers 132 and 134, respectively. Transport of catalyst through vertical conduits 104 and 106 is intended to take place alternately so that catalyst will be flowing at a substantially constant rate but will be flowing only into one hopper at any given time. Assuming that hopper 132 is receiving catalyst from vertical conduit 104, valve 125 and valve 136 supplying fluidizing gas to hopper 132 will be closed and valve 137 will be open to vent the gas present in the fluidized catalyst. The catalyst will be deposited in hopper 132 and vent gas only will pass through filter 138, conduit 140 and valve 137.

While hopper 132 is filling, hopper 134 will be filled with a mass of solid particles and will be operated so as to introduce these solid particles into reactor 70. This is accomplished by closing valve 152 and opening valve 142 to bring the pressure in hopper 134 to approxmiately the pressure in reactor 70. Valve 142 is then closed. Fluidizing gas is then introduced by opening valve 144 which is connected to nozzle 148 positioned near the lower end of vertical conduit 150, the lower end of which terminates below the body of solid particles of catalyst in hopper 134 and preferably near the base of hopper 134, as illustrated.

Vertical conduit 150 is provided with a vent 154. This vent is connected to conduit 150 by a pipe provided with valve 156. This valve is closed during the introduction operation. The fluidizing gas introduced through nozzle 148 passes into the lower end of conduit 150 and causes the catalyst in the column 150 to break up and to become fluidized. This fluidizing gas is introduced at a somewhat higher pressure than exists in reactor 70. Only a small pressure differential such as about 40 p. s. i. is required. As a consequence of this gas introduction the compact solid column of catalyst particles in vertical conduit 150 breaks up and becomes fluidized and is transported upward into conduit 158 and thence into reactor 70. At the same time catalyst in hopper 134 gravitates to the base and is similarly transported into reactor 70. When hopper 134 has been about emptied the passage of gas through nozzle 148 is terminated and the suspension of solid particles in gas contained in column 150 is permitted to settle to form a compact column of such length that the vent 154 is effective, as previously described, i. e., the settled catalyst must occupy sufficient space above this vent to dissipate the pressure. The base of the hopper acts as a support for the compact column during this stage of the operation. At this point valves 152 and 156 are opened. The high pressure in reactor 70 is effectively prevented from passing through conduit 150 by the compact solid column in conduit 150 in accordance with the principles of my invention.

Hopper 134 is now refilled with catalyst. This is accomplished by closing valve 127 and introducing transport gas through conduit 130 at low pressure to break up and fluidize the compact column in conduit 122. When this is accomplished flow through conduit 130 is terminated and gas flow through conduit 118 is initiated by opening the valve connected thereto. Fluidized catalyst then flows through vertical conduit 122 into hopper 134 to again fill it with a mass of solid particles. When sufficient solid particles have been transported into 134 the flow of catalyst is terminated by closing flow through conduits 118 and 119 and opening valve 127. The solid catalyst in conduit 122 is thus permitted to settle to form a vertical column of compact solid particles which forms an effective seal against backflow of gas from hopper 134 during the introduction operation previously described.

While the introduction of the contents of hopper 134 into reactor 70 is taking place hopper 132 is filling with solid catalyst to be subsequently introduced into reactor 70, as indicated previously. Filling of hopper 132 is accomplished by introducing gas through conduit 128 at the base of column 120, valve 125 being closed to fluidize the solid particles in the column and then terminating flow through conduit 128 and initiating flow through conduits 116 and 117. Catalyst is thus removed from column 104 and transported through conduits 117 and 120 into hopper 132 which retains the solid particles and vents the gas through conduit 140 and valve 137, as previously described in connection with hopper 134. When hopper 132 has been filled the flow of catalyst is terminated by terminating the flow of transport gas through conduits 116 and 117. The solid particles in vertical conduit 120 then settle therein to form a vertical compact column vented at the mid portion by vent 124.

The catalyst in hopper 132 is then introduced into reactor 70. This introduction operation is accomplished as described in connection with hopper 134; i. e., valves 136, 137 and 160 are closed and valves 125 and 172 opened. When hopper 132 reaches about the pressure in reactor 70 valve 172 is closed and valve 136 is opened. The fluidizing gas flowing through valve 136 and nozzle 164 causes the catalyst to become fluidized in vertical conduit 166 and this fluidized catalyst with the high pressure gas flows through conduit 158 into reactor 70. Upon termination of this operation valve 136 is closed and the catalyst in column 166 is permitted to settle to form a compact vertical column. Valve 160 then is opened and this causes the compact vertical column of solids in conduit 166 to act as a pressure seal to prevent gas from leaking from reactor 70 into hopper 132. Refilling of hopper 132 at low pressure is then re-started. In the interim hopper 134 has been refilled and emptying into reactor 70 is started.

It is to be noted that when hoppers 132 and 134 are pressured up through valves 142 and 172 backflow of high pressure gas through lines 120 or 122 is prevented by the compact vented columns of solid particles in lines 120 and 122. Similar backflow from lines 117 and 119 into regenerator 98 during flow of gas from lines 128 and 130 is prevented by vented compact vertical columns of solid particles in conduits 104 and 106. These last-mentioned columns need not have as great a height because the pressure differential is much smaller.

It is thus possible to continuously remove catalyst from high pressure reactor 70, to continuously regenerate it at a low pressure, such as about atmospheric pressure, and to then continuously introduce it back into the reactor 70. Although the introduction through hoppers 132 and 134 takes place intermittently they are complementary so that introduction is continuous.

It will be noted that vertical conduits 120, 122, 150 and 166 are of unusual length and necessitate loops to return the elevated catalyst to the hoppers or reactors as the case may be. This is necessary in the embodiment illustrated in Figure 6 in order to have sufficient catalyst in the vertical conduit to form a seal against backflow of gas when the solids settle into a compact column. It is this factor which determines the height of the vertical conduit. It will be evident that when the lower part of these vertical conduits contains a compact column of solid particles the top of this compact column should be at a sufficient distance above the vent that the gas and solid particle pressure will be dissipated as previously described.

The necessity for such high vertical columns for charging catalyst into the introduction hopper is avoided by the apparatus illustrated in Figure 7. Referring to this figure, numeral 180 designates a high pressure reactor containing a fluidized bed of catalyst particles. Numeral 182 designates a vertical conduit provided with a vent and solid removal means 184. Numeral 186 designates a conduit connected to the lower end of vertical conduit 182 and to the upper part of a low pressure regenerator 188. Numeral 190 indicates a vertical conduit provided with a vent and solid filter means 192, the lower end of which conduit is connected with a conduit 194 which leads to hopper 196. Hopper 196 is provided with a vertical conduit 198, valve 200 and vent and solid filter means 202. Numeral 204 designates means for introducing fluidizing gas into hopper 196.

During operation of this apparatus a reaction such as destructive hydrogenation of a hydrocarbon at high pressure in the presence of a fluidized hydrogenation catalyst is carried out in known manner in reactor 180. Solid catalyst particles in reactor 180 settle into vertical column 182 continuously. These solid particles are continuously removed by low pressure transport gas passing through conduit 186 and are thus conveyed into low pressure regenerator 188 where they become regenerated. Leakage of high pressure gas from reactor 180 is prevented by maintaining a compact column of catalyst particles in conduit 182 at all times and venting through 184 which is provided with a solid particle filter.

The solid particles in regenerator 188 accumulate in vertical column 190 and are partially removed therefrom intermittently by intermittent passage of low pressure transport gas through conduit 194. When hopper 196 contains the required amount of solid particles, passage of solid particles is terminated by closing the valve connected to conduit 194. Hopper 196 is then pressured up to approximately the pressure existing in reactor 180 and high pressure transport gas is introduced through conduit 204 into the lower portion of hopper 196. Valve 200 is closed and as a consequence the compact column in 198 is fluidized and conveyed by the high pressure gas flowing from conduit 204 into reactor 180. This transport operation is then terminated by closing the valve on conduit 204. The catalyst in vertical conduit 198 settles to form a compact column and valve 200 is opened. At this stage the compact column in 198 acts as a pressure seal between hopper 196 and reactor 180. While high pressure exists in hopper 196 during the period that catalyst is flowing therefrom in reactor 180 leakage of this gas into regenerator 188 is prevented by the valve action of the compact column of solid particles in vertical conduit 190. Thus the high pressure in 196 is exerted through conduit 194 against the base of vertical conduit 190 but this gas and the high pressure is dispersed through vent 192 and against the walls of the vertical conduit as previously described.

The operation of the apparatus illustrated in Figure 7 would be intermittent. However, by providing a plurality of hoppers as illustrated in Figure 6 operation could be made continuous. It will be noted that the base of vertical columns 120 and 122 in Figure 6 and the base of vertical columns 182 and 190 in Figure 7 do not necessitate any particular kind of supporting means for the column of solid. It has been found that an ordinary pipe elbow or T will be sufficient to retain a pile of catalyst which will act as a support for the column above it. When transport gas is passed through this elbow or T the pile of catalyst is transported away and consequently in the case of columns 182 and 190 the compact solid starts to flow from the column into the transport gas and is thus further removed until termination of flow of the transport gas. The gas used to introduce catalyst through vertical conduits 150 and 166 of Figure 6 and conduit 198 of Figure 7 should preferably be one which is used in the reaction. In this instance hydrogen would be advantageous. In any event the gas should be one which will not interfere with the reaction in the reactor. A normally gaseous substance need not be used. A vapor is satisfactory if the temperature of the column, etc. is above the boiling point.

While the apparatus illustrated in Figure 7 eliminates only the use of long introduction conduits for charging into the hopper, the use of long introduction conduits for charging into the reactor can also be avoided. Thus vertical conduit 198 can be connected to reactor 180 at a point which is below the expanded bed level of catalyst in reactor 180 to allow conduit 198 to fill with catalyst from the reactor at the time the upward flow of catalyst is discontinued. In the absence of such a modification conduit 198 should be of sufficient height to hold enough expanded catalyst to form a compact column seal when the catalyst therein is permitted to settle.

Bleed gas from the vents of the vertical columns can be collected and reused. For instance, if the bleed gas from the column connected to the reactor contains hydrogen it can be collected and reused by pumping back into the high pressure reactor. The specific construction illustrated in Figure 2 would permit this i. e. conduit 42 could be connected to a suitable storage system from which the vented gas could be withdrawn for reuse. The catalyst in locks 132 and 134 of Figure 6 and in lock 196 of Figure 7 is not in an aerated state during the time that the high pressure fluidizing gas is introduced at the base. This gas flows upwardly through the column and aerates the solid particles in the column only. It would appear that breaking up of a compact column of particles after it had been subjected to a high pressure at one end and a low pressure at the other end would be a difficult problem. Actually no difficulty is encountered in this connection. As shown as the pressure in the hopper approximates that in the reactor the introduction of the gas at the base of the column causes the column to break up into a fluidized condition which is readily transported. When this has taken place the pile of catalyst in the hopper falls down into the gas stream flowing up the vertical column and is transported with it.

It will be apparent that my invention has wider application than in the specific operations described. For instance it is of value in connection with fluidized catalytic cracking of petroleum products, fluidized hydroforming of petroleum products and the synthesis of hydrocarbons from carbon monoxide and hydrogen using a fluidized catalyst. Destructive hydrogenation of powdered coal or hydrodesulfurization of powdered coal may also be carried out utilizing my invention to introduce the coal powder and remove the ash or residue. My invention is also applicable to non-catalytic operations such as the coking of coal and the adsorption of gases or vapors on a solid adsorbent at elevated pressure followed by desorption at lower pressure.

This application is related to my co-filed application Serial No. 236,537, "Valve and Process for Transfer of Solid Particles," which generically covers the vented packed column and certain specific modifications. Reference is also made to my co-filed application Serial No. 236,539 which relates to a specific modification of the subject matter described herein. The present application is specifically directed to introduction apparatus such as illustrated in vertical conduits 104, 106, 120, 122, 150 and 166 of Figure 6 and vertical columns 190 and 198 of Figure 7, and combinations thereof to form a complete introduction system as illustrated. It is to be noted that columns 120, 122, 150 and 166, Figure 6, and 190 and 198, Figure 7, which are specifically covered herein, operate on a similar principle to that of the removal column such as illustrated in column 78, Figure 6, and 182, Figure 7. That is, the principle of venting most of the gas at some point intermediate the ends of the column rather than allowing most of the gas to flow completely through the column is the same. However column 190, Figure 7, involves the additional discovery that the low pressure end of the column (upper end) need not be immersed in a bed of rigidly supported catalyst to avoid upward catalyst flow, provided the gravity effect of the body of catalyst above the vent is sufficient to offset the static gas pressure existing at the vent. This static gas pressure is determined by the pressure drop through the vent.

What I claim is:

1. Apparatus of the character described comprising a substantially vertical conduit adapted to retain solid particles in a compact column, a continuous compact column of solid particles in said conduit, said particles being of a size suitable for fluidization, means for supplying solid particles under elevated pressure to one end of the vertical conduit, a gas vent positioned between the ends of the vertical conduit and means associated with the vent for preventing substantial flow of solid particles through the vent.

2. Apparatus of the character described comprising a substantially vertical conduit adapted to retain solid particles in a compact column, a continuous compact column of solid particles in said conduit, said particles being of a size between about 100 and 400 mesh, means for supplying solid particles under elevated pressure to the lower end of the vertical conduit, a gas vent positioned between the ends of the vertical conduit and means associated with the vent for preventing substantial flow of solid particles through the vent.

3. Apparatus of the character described comprising a substantially vertical conduit adapted to retain solid particles in a compact column, a continuous compact column of solid particles in said conduit, said particles being of a size suitable for fluidization, means for supplying solid particles under elevated pressure to the lower end of the vertical conduit, a gas vent positioned between the ends of the vertical conduit, means associated with the vent for preventing substantial flow of solid particles through the vent and a valve for controlling the flow of gas through the vent.

4. Apparatus of the character described comprising a substantially vertical conduit adapted to retain solid particles in a compact column, a continuous compact column of solid particles in said conduit, said particles being of a size suitable for fluidization, a support for solid particles positioned below and in spaced relation to the lower end of the vertical conduit, means for supplying solid particles under elevated pressure to the space between the support and the lower end of the vertical conduit, means for introducing a gas under elevated pressure into the lower end of the vertical conduit, a gas vent positioned between the ends of the vertical conduit, and means associated with the vent for preventing substantial flow of solid particles through the vent.

5. Apparatus of the character described comprising a substantially vertical conduit adapted to retain solid particles in a compact column, a continuous compact column of solid particles in said conduit, said particles being of a size between about 100 and 400 mesh, a support for solid particles positioned below and in spaced relation to the lower end of the vertical conduit, means for supplying solid particles under elevated pressure to the space between the lower end of the vertical conduit and the support, means for introducing a gas under high pressure into the lower end of the vertical conduit, a gas vent positioned between the ends of the vertical conduit, means associated with the vent for preventing substantial flow of solid particles through the vent and a valve for controlling the flow of gas through the vent.

6. Apparatus of the character described comprising a substantially vertical conduit adapted to retain solid particles in a compact column, a continuous compact column of solid particles in said conduit, said particles being of a size suitable for fluidization, means for supplying solid particles under relatively low pressure to the upper end of the vertical conduit, means for removing solid particles at a controlled rate from the lower end of the vertical conduit, a gas vent positioned between the ends of the vertical conduit and means associated with the vent for preventing substantial flow of solid particles through the vent.

7. Apparatus of the character described comprising a substantially vertical conduit adapted to retain solid particles in a compact column, a continuous compact column of solid particles in said conduit, said particles being of a size between about 100 and 400 mesh, means for supplying solid particles under relatively low pressure to the upper end of the vertical conduit, a support for solid particles positioned below the lower end of the vertical conduit, means for removing solid particles at a controlled rate from the lower end of the vertical conduit, a gas vent positioned between the ends of the vertical conduit, and means associated with the vent for preventing substantial flow of solid particles through the vent.

8. Apparatus which will permit intermittent unidirectional flow therethrough of solid particles during a low pressure period and which will prevent substantial reverse flow of high pressure gas therethrough during intermittent high pressure periods which comprises in combination a substantially vertical conduit adapted to retain solid particles in a compact column, a continuous compact column of solid particles in said conduit, said particles being of a size suitable for fluidization, means for introducing solid particles into one end thereof, means for discharge of solid particles from the other end thereof, a gas vent positioned between the ends of the conduit, means associated with the vent for preventing substantial flow of solid particles through the vent and means for intermittently subjecting the other end of the conduit to a substantially higher pressure than the end of the conduit into which solid particles are introduced.

9. Apparatus which will permit intermittent unidirectional flow therethrough of solid particles during a low pressure period and which will prevent substantial reverse flow of high pressure gas therethrough during intermittent high pressure periods which comprises in combination a substantially vertical conduit adapted to retain solid particles in a compact column, a continuous compact column of solid particles in said conduit, said particles being of a size suitable for fluidization, means for introducing solid particles into the upper end thereof, means for controlled discharge of solid particles from the lower end thereof, a gas vent positioned between the ends of the column, means associated with the vent for preventing substantial flow of solid particles through the vent and means for intermittently subjecting the lower end of the column to a substantially higher pressure than the upper end of the column.

10. Apparatus of the character described comprising a substantially vertical conduit adapted to retain solid particles in a compact column, a continuous compact column of solid particles in said conduit, said particles being of a size suitable for fluidization, means for connecting the upper end of the conduit to a high pressure chamber, a closed hopper for solid particles connected to the lower end of the conduit so that the lower end of the conduit will be immersed in a mass of solid particles contained in the hopper during operation, means for introducing solid particles from a low pressure zone into the hopper, sealing means for said hopper and means for introducing into said hopper and adjacent the base of the conduit a fluidizing gas under high pressure.

11. Apparatus for intermittently introducing solid particles from a low pressure zone into a high pressure chamber without substantial flow of gas from the high pressure chamber into the low pressure zone which comprises in combination a substantially vertical conduit adapted to retain solid particles in a compact column and adapted to be connected at its upper end to a high pressure chamber, a continuous compact column of solid particles in said conduit, said particles being of a size suitable for fluidization, a vent for gas positioned intermediate the ends of the conduit, means for preventing flow of a substantial amount of solid particles through said vent, a valve for controlling the flow of gas through the gas vent, a closed hopper for solid particles connected to the lower end of the conduit so that the lower end of the conduit will be immersed in a mass of solid particles contained in the hopper during operation, means for introducing solid particles from the low pressure zone into the hopper, sealing means for said hopper and means for introducing into said hopper and adjacent the end of the conduit a fluidizing gas under high pressure.

12. Apparatus for intermittently introducing solid particles from a low pressure zone into a high pressure chamber without substantial flow of gas from the high pressure chamber into the low pressure zone which comprises in combination a substantially vertical conduit adapted to retain solid particles in a compact column, and adapted to be connected at its upper end to a high pressure chamber, a continuous compact column of solid particles in said conduit, said particles being of a size between about 100 and 400 mesh, a vent for gas positioned at about the midpoint of the vertical conduit, means for preventing flow of a substantial amount of solid particles through said vent, a valve for controlling the flow of gas through the gas vent, a closed hopper for the solid particles connected to the lower end of the conduit so that the lower end of the conduit will be immersed in a mass of solid particles contained in the hopper during operation, means for introducing solid particles from the low pressure zone into the hopper, sealing means for said hopper and means for introducing into said hopper and adjacent the end of the conduit a fluidizing gas under high pressure.

13. Apparatus for intermittently introducing solid particles into a high pressure chamber from a low pressure zone without substantial flow of gas from the high pressure chamber into the low pressure zone which comprises in combination a first substantially vertical conduit adapted to retain solid particles in a compact column and adapted to be connected at its upper end to a high pressure chamber, a closed hopper for solid particles connected to the lower end of the first vertical conduit so that the lower end of the conduit will be immersed in a mass of solid particles contained in the hopper during operation, a vent for gases positioned intermediate the ends of the first vertical conduit, means for preventing substantial flow of particles into said vent, a valve for controlling flow of gas through the vent, a second substantially vertical conduit adapted to retain solid particles in a compact column, means for introducing solid particles into the lower end of the second vertical conduit, a vent for gases which is positioned intermediate the ends of the second vertical conduit, means for preventing substantial flow of solid particles into said vent, a pipe connecting the upper end of the second vertical conduit with the hopper, means for delivering solid particles suspended in a transporting gas to the base of the second vertical conduit and means for introducing into said hopper and adjacent to the base of the first vertical conduit a fluidizing gas under elevated pressure.

14. Apparatus for intermittently introducing solid particles into a high pressure chamber from a low pressure zone without substantial flow of gas from the high pressure chamber into the low pressure zone which comprises in combination a first substantially vertical conduit adapted to retain solid particles in a compact column and adapted to be connected at its upper end to a high pressure chamber, a closed hopper for solid particles connected to the lower end of the first vertical conduit so that the lower end of the conduit will be immersed in a mass of solid particles contained in the hopper during operation, a second substantially vertical conduit adapted to retain solid particles in a compact column, means for introducing solid particles into the upper end of the second vertical conduit, a vent for gases positioned intermediate the ends of the second vertical conduit, means for preventing substantial flow of solid particles into said vent, a pipe connecting the lower end of the second vertical conduit with the hopper, means for controlled discharge of solid particles from the lower end of the second vertical conduit, means for transporting discharged solid particles through said pipe from the lower end of the second conduit into the hopper and means for introducing into said hopper and adjacent to the base of the first vertical conduit a fluidizing gas under elevated pressure.

15. Apparatus for intermittently introducing solid particles into a high pressure chamber from a low pressure zone without substantial flow of gas from the high pressure chamber into the low pressure zone which comprises in combination a first substantially vertical conduit adapted to retain solid particles in a compact column and adapted to be connected at its upper end to a high pressure chamber, a closed hopper for solid particles connected to the lower end of the first vertical conduit so that the lower end of the conduit will be immersed in a mass of solid particles contained in the hopper during operation, a second substantially vertical conduit adapted to retain solid particles in a compact column, means for introducing solid particles into the upper end of the second vertical conduit, a vent for gases which is positioned intermediate the ends of the second vertical conduit, means for preventing substantial flow of solid particles into said vent, a pipe connecting the lower end of the second vertical conduit with the hopper, means for delivering solid particle transporting gas at elevated pressure and in controlled amounts to the base of the second vertical conduit and means for introducing into said hopper and adjacent to the base of the first vertical conduit a fluidizing gas under elevated pressure.

16. Apparatus for intermittently introducing solid particles into a high pressure chamber from a low pressure zone without substantial flow of gas from the high pressure chamber into the low pressure zone which comprises in combination a first substantially vertical conduit adapted to retain solid particles in a compact column and adapted to be connected at its upper end to a high pressure chamber, a closed hopper for solid particles connected to the lower end of the first vertical conduit so that the lower end of the conduit will be immersed in a mass of solid particles contained in the hopper during operation, a vent for gases positioned intermediate the ends of the first vertical conduit, means for preventing substantial flow of particles into said vent, a valve for controlling flow of gas through the vent, a second substantially vertical conduit adapted to retain solid particles in a compact column, means for introducing solid particles into the upper end of the second vertical conduit, a vent for gases which is positioned intermediate the ends of the second vertical conduit, means for preventing substantial flow of solid particles into said vent, a pipe connecting the lower end of the second vertical conduit with the hopper, means for delivering solid particle transporting gas at elevated pressure and in controlled amounts to the base of the second vertical conduit and means for introducing into said hopper and adjacent to the base of the first vertical conduit a fluidizing gas under higher pressure than the high pressure chamber.

17. In a process for transferring solid particles of a mesh size between about 100 and 400, between systems at different pressures the step which comprises forming the solid particles into a continuous compact column one end of which is exposed to the higher pressure and the other end of which is exposed to the lower pressure and removing gas substantially free of solid particles, which gas leaks from the higher pressure system into the high pressure end of the compact column, at a point intermediate the ends of the column said column being of a minimum length corresponding to the following formula:

$$L = 0.0235 \frac{P_i^2 - P_o^2}{G}$$

wherein $L = \frac{1}{2}$ column length in feet; $P_i$ = pressure at the high pressure end in p. s. i. g.; $P_o$ = pressure at the low pressure end in p. s. i. g. and $G$ = total gas leakage based on cross sectional area of the column in lb./hr./sq. ft.

18. The method of introducing solid particles into a high pressure chamber which comprises forming a compact column of the solid particles within a gas tight conduit one end of which is connected to the high pressure chamber and the other end of which is connected to a closed reservoir, introducing solid particles into the closed reservoir while at a lower pressure, introducing a gas under high pressure into the base of the compact column to cause the solid particles forming the compact column to become suspended in the gas and flow into the high pressure chamber, discontinuing gas introduction, forming the suspended gas particles remaining in the gas tight conduit into a compact column, bleeding gas free of solid particles from a point intermediate the ends of the compact column and introducing additional solid particles into the closed reservoir while it is at a lower pressure.

References Cited in the file of this patent

UNITED STATES PATENTS

| | | |
|---|---|---|
| 494,274 | Kelly | Mar. 28, 1893 |
| 1,498,630 | Jensen | June 24, 1924 |
| 2,338,606 | Voorhees | Jan. 4, 1944 |
| 2,448,272 | Payne et al. | Aug. 31, 1948 |
| 2,490,828 | Newton | Dec. 13, 1949 |
| 2,502,954 | Blanding | Apr. 4, 1950 |
| 2,509,983 | Morrow | May 30, 1950 |
| 2,546,625 | Bergstrom | Mar. 27, 1951 |
| 2,590,202 | Norton | Mar. 25, 1952 |
| 2,591,040 | Bartow | Apr. 1, 1952 |
| 2,626,235 | Wilson | Jan. 20, 1953 |

FOREIGN PATENTS

| | | |
|---|---|---|
| 126,783 | Australia | Feb. 26, 1948 |